A. G. Buzby,
Billiard Cushion,
Nº 83,759.      Patented Nov. 3, 1868.

Witnesses.      Inventor

ALBERT G. BUZBY, OF PHILADELPHIA, PENNSYLVANIA.

Letters Patent No. 83,759, dated November 3, 1868.

SUBSTITUTE FOR A BILLIARD-TABLE.

The Schedule referred to in these Letters Patent and making part of the same.

*To all whom it may concern:*

Be it known that I, ALBERT G. BUZBY, of Philadelphia, Pennsylvania, have invented a Substitute for a Billiard-Table; and I do hereby declare the following to be a full, clear, and exact description of the same.

My invention consists of a cheap substitute for a billiard-table, composed of a number of strips connected together, and arranged for temporary attachment to the floor, substantially as described hereafter, so that the carpet may be used as the bed over which the balls are propelled, the strips being readily removed and packed away, and as readily reconverted into an impromptu billiard-table for family amusement.

My invention further consists of so connecting together the rounded ends of the strips by angular plates, that the latter will serve as substitutes for the corner pockets of billiard-tables.

I will now proceed to describe the mode of carrying my invention into effect, reference being had to the accompanying drawing, which forms a part of this specification, and in which—

Figure 1:
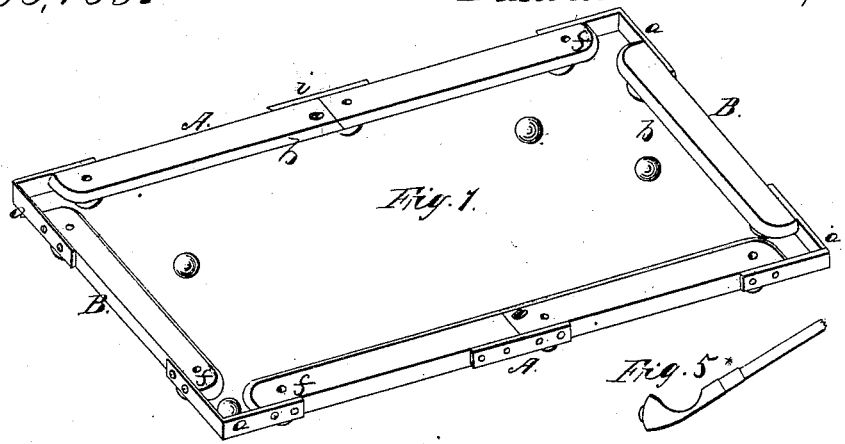
Figure 2:
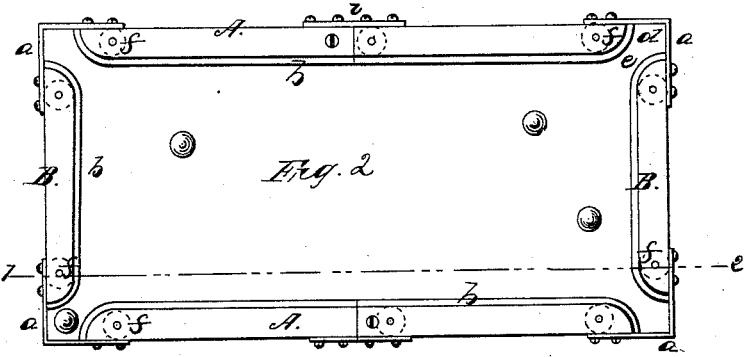
Figure 4:
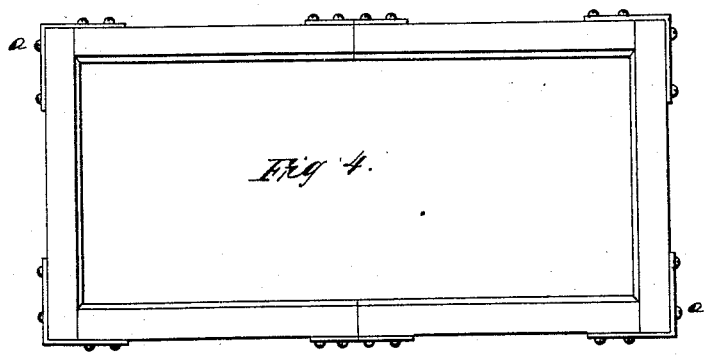
Figure 3:
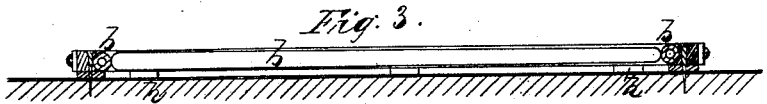

Figure 1 is a perspective view of my substitute for a billiard-table;

Figure 2, a plan view;

Figure 3, a section on the line 1–2, fig. 2;

Figure 4, a plan of a modification of my invention; and

Figure 5:

Figure 5, a view of an instrument to be used for striking the balls.

On reference to figs. 1, 2, and 3, A and A' are two parallel side strips, and B and B' two parallel end strips, arranged at right angles to the side strips, as shown in the drawing.

These strips consist of light wooden slats, rounded at the ends, as best observed on reference to figs. 1 and 2, the inner edge of each strip being grooved for receiving a tube or strip, $b$, of gum-elastic, or other suitable cushion.

The strips are so arranged, that the rounded ends of the side strips are at a short distance apart from those of the end strips, but they are connected together by angular corner-pieces $a$, of metal, the spaces $d$, within which, serve as substitutes for the pockets of ordinary billiard-tables.

Sharp-pointed pins $ff$ project from the under side of the strips, at the points shown, so as to penetrate the floor a short distance, and thereby serve to maintain the strips in their proper relative position, and wherever these pins occur, there are beneath the strips, thin projections, which serve to maintain the former a short distance above the carpet.

Although each of the strips A and A' may be made in one piece, I prefer to make each in two lengths, secured together by a plate, $i$, or, if desired, they may be hinged together in any appropriate manner, for being folded into a small space.

The several strips thus connected together, are simply placed on the carpet, through which the pins are forced into the floor, and an impromptu billiard-table is at once formed, the players being in a standing position, and using, for propelling the balls, an instrument of the form or approximating to the form represented in fig. 5.

When the games are finished, and this cheap substitute for a billiard-table is not required for further use, the strips can be elevated from the carpet, the pins being readily withdrawn from the floor, the strips detached from each other, and the two halves of the large strips separated or folded, and the whole of the apparatus may thus be packed in a comparatively small box, or deposited in any out-of-the-way corner.

In fig. 4, the side strips meet and fit into the end strips, the corners being properly strengthened. This arrangement may be adopted when games requiring no substitutes for pockets are played.

Simple screws are shown in connection with the plates $a$ and $i$, for securing the several strips together, but it will be evident that a variety of fastenings may be employed for this purpose.

I claim as my invention, and desire to secure by Letters Patent—

1. A substitute for a billiard-table, consisting of cushioned strips, connected together and to the floor, substantially as described, for the purpose specified.

2. The rounded ends of the strips, in combination with the plates $a$, for the purpose specified.

In testimony whereof, I have signed my name to this specification, in the presence of two subscribing witnesses.

A. G. BUZBY.

Witnesses:
JOHN WHITE,
HARRY SMITH.